Figure 1:
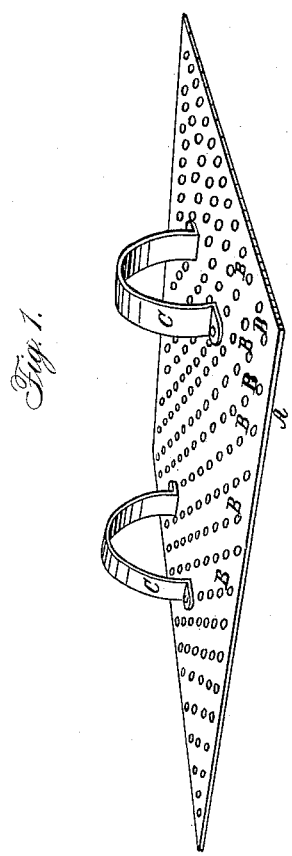

T. G. ARNOLD.
Gas Purifier.

No. 58,749.

Patented Oct. 16, 1866.

Witnesses:

Inventor:

UNITED STATES PATENT OFFICE.

T. G. ARNOLD, OF NEW YORK, N. Y.

IMPROVEMENT IN SCREENS FOR GAS-PURIFIERS.

Specification forming part of Letters Patent No. 58,749, dated October 16, 1866.

*To all whom it may concern:*

Be it known that I, T. G. ARNOLD, of the city, county, and State of New York, have invented certain new and useful Improvements in the Manufacture of Perforated Metal Plates or Sieves for Gas-Purifiers; and I do hereby declare that the following is a full description of the same.

Before, however, proceeding to describe my invention, it may be proper to explain the operation of purifying the gas in the process of making carbureted hydrogen gas for illuminating purposes.

It is, perhaps, well known that all gas generated from coal is more or less impregnated with free sulphur. To get rid of this it is filtered through a succession of layers of wet lime laid on "frames" or "sieves," as they are called. These frames or sieves are sometimes made of wood, having a great number of perforations in them, or with longitudinal slats across them, somewhat like the grate-bars of a furnace, or are made from heavy iron plate metal having perforations in them. Through these perforations, or the spaces between the slats in the wood frames, the gas passes and enters the layers of lime on the upper surfaces of the sieves, to be purified or freed from any sulphur it may contain.

In practice the wood frames or sieves soon become destroyed or rotted out, and therefore are very little used. Perforated iron plates are, therefore, generally used; but owing to the affinity of sulphur for iron, and the destructive properties of wet lime in corroding the iron plates, they also are soon destroyed. To obviate this as much as possible, they are generally made of very heavy metal. Although this obviates the frequent renewal of the iron plates, yet, owing to their great weight and the frequent necessity of changing the lime on them, and the great number of them used in large gas-works, it imposes an immense amount of labor on the works, and, as a matter of course, adds greatly to the cost of the manufacture of the gas.

The object of my invention is to overcome these difficulties; and the nature of my invention to accomplish these important results consists in making a non-oxidizable perforated metal plate or sieve, by making the sieves of thin perforated iron plates, and then galvanizing them, so as to protect the iron from the direct action of the sulphur or corrosive effects of the lime.

But to describe my invention more particularly, I will refer to the accompanying drawing, forming a part of this specification, the same letters of reference, wherever they occur, referring to like parts.

Figure 1 is a perspective view of the plate or sieve.

Letter A is a plate of metal, of about a sixteenth of an inch thick, and about ten inches square. It will be obvious that for larger sieves the thickness of the metal will be proportioned to the weight of the lime spread upon its upper surface, which in no instance, however, will require to be more than the eighth of an inch thick, or about half as thick as the metal plates now ordinarily used.

Through the plates are perforated a great number of holes, B, of about a quarter of an inch in diameter. These perforations are made in the plate before galvanizing. The object of this will be obvious. If the perforations were made after being galvanized, there would be the exposed surfaces of the iron throughout the circumference of the perforations, which would be instantly attacked by the sulphur, and, secondly, would be decomposed by the local galvanic action generated by the action of the alkaline solution of the lime on the two metals of zinc and iron composing the sieve; and, thirdly, there would be an unnecessary waste of zinc to galvanize the parts of the plate struck out.

In my experiments I have made them in the first instance from previously-galvanized metal plates, and though I found them to answer very well, and more durable than ungalvanized metal plates, yet, owing to the causes I have enumerated, they did not possess all the advantages I desired to obtain. I therefore prepared the plates or sieves by first perforating them and then galvanizing, and now find that, after subjecting them to constant use for several months, they do not show the least deterioration; while, for convenience in handling (for which purpose the handles c are attached to it) and cheapness of construction over the heavy iron plates in use, they give the most unbounded satisfaction.

Having now described my invention, I will proceed to set forth what I claim and desire to secure by Letters Patent of the United States.

I claim—

The new manufacture of galvanized-metal gas-sieves, in contradistinction to ungalvanized-iron gas-sieves, for the purposes hereinbefore set forth.

T. G. ARNOLD.

Witnesses:
CHARLES BUCKINGHAM, Jr.,
C. L. BARRITT.